United States Patent
Sano et al.

(10) Patent No.: US 8,158,050 B2
(45) Date of Patent: Apr. 17, 2012

(54) PROCESS FOR PRODUCING PNEUMATIC TIRE

(75) Inventors: Takuzou Sano, Kanagawa (JP); Noboru Takada, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/745,390

(22) PCT Filed: Oct. 28, 2008

(86) PCT No.: PCT/JP2008/069563
§ 371 (c)(1),
(2), (4) Date: May 28, 2010

(87) PCT Pub. No.: WO2009/081656
PCT Pub. Date: Jul. 2, 2009

(65) Prior Publication Data
US 2010/0327495 A1  Dec. 30, 2010

(30) Foreign Application Priority Data
Dec. 21, 2007  (JP) .................. 2007-330942

(51) Int. Cl.
*B29C 49/62*  (2006.01)
(52) U.S. Cl. ........................ 264/501; 264/571
(58) Field of Classification Search ............... None
See application file for complete search history.

(56) References Cited

U.S. PATENT DOCUMENTS

| | | | | |
|---|---|---|---|---|
| 5,238,643 A | * | 8/1993 | Kobayashi | 264/501 |
| 6,468,062 B1 | | 10/2002 | Soulalioux et al. | |
| 6,479,008 B1 | * | 11/2002 | Caretta | 264/501 |
| 6,663,735 B2 | * | 12/2003 | Hashimura et al. | 156/133 |
| 2004/0046286 A1 | * | 3/2004 | Seko et al. | 264/326 |

FOREIGN PATENT DOCUMENTS

| | | |
|---|---|---|
| JP | 2001-088143 A | 4/2001 |
| JP | 2001-260135 A | 9/2001 |
| JP | 2003-340824 A | 12/2003 |

* cited by examiner

*Primary Examiner* — Monica A Huson
(74) *Attorney, Agent, or Firm* — Carrier Blackman & Associates, P.C.; Joseph P. Carrier; William D. Blackman

(57) ABSTRACT

A green tire (G) is formed by stacking a tire component such as a carcass layer (13) on a film (12) which is made of a thermoplastic resin or a thermoplastic elastomer composition and which is disposed on the entire outer circumferential surface of a cylindrical rigid inner die (1) formed of split parts (2). The green tire (G) is placed in a vulcanizing mold together with the rigid inner die (1) and then heated to a given temperature. The film (12) is pressurized from the inner circumferential side and inflated, and the green tire (G) is vulcanized. Thus, unvulcanized rubber of the tire components is pressed toward the inner circumferential surface of the vulcanizing mold and flows in circumferential directions. As a result, volume unevenness of the tire components is corrected. The film (12) which functions as a bladder is tightly bonded to the inner circumferential surface of the tire to become an inner layer of the tire.

5 Claims, 6 Drawing Sheets

PROCESS FOR PRODUCING PNEUMATIC TIRE

TECHNICAL FIELD

The present invention relates to a process for producing a pneumatic tire. More specifically, the present invention relates to a process for producing a pneumatic tire capable of efficiently producing a pneumatic tire which includes a lightweight inner layer having excellent air permeation prevention performance and which is excellent in uniformity.

BACKGROUND ART

There have been proposed various processes for producing a pneumatic tire in which a green tire is formed on an outer circumferential surface of a rigid inner die made of metal, and in which the formed green tire is then placed inside a vulcanizing mold together with the rigid inner die and vulcanized (refer to Patent Documents 1 and 2, for example). According to the aforementioned production methods using the rigid inner die, a rubber-made bladder, which has been used heretofore, is no longer necessary. Thus, the step of removing the formed green tire from a making drum, or the like can be omitted. In addition, as compared with the case where the tire is produced using a bladder, the aforementioned production methods are advantageous in that the inner circumferential surface of the vulcanized tire can be accurately formed in a predetermined shape.

During the vulcanization, however, the green tire is only pressed by the vulcanizing mold from the outer side, so that the amount of pressing force acting on the inner circumferential surface of the green tire becomes small. Accordingly, for example, if the volumes of tire components are uneven in the inner circumferential surface of the tire, it is difficult to correct the unevenness, and an improvement in uniformity of the vulcanized tire is thus limited.

Moreover, when the inner circumferential surface of the green tire is pressed against the outer circumferential surface of the rigid inner die, a gap between split parts forming the rigid inner die leaves a mark on the inner circumferential surface of the vulcanized tire. This presents a problem of reduced quality of the external appearance.

In addition, butyl rubber is mainly used for an inner layer (innermost circumferential surface) of the green tire. Accordingly, an additional operation of, for example, applying a remover is required to separate the inner layer from the outer circumferential surface of the rigid inner die easily.

Moreover, the inner layer made of butyl rubber requires a certain degree of thickness to secure sufficient air permeation prevention performance. For this reason, such an inner layer is disadvantageous in reducing the weight of the tire. Accordingly, an inner layer which has excellent air permeation prevention performance and which is light in weight has been desired.

Patent Document 1: Japanese patent application Kokai publication No. 2001-88143

Patent Document 2: Japanese patent application Kokai publication No. 2003-340824

DISCLOSURE OF THE INVENTION

Problem to be Solved by the Invention

An object of the present invention is to provide a process for producing a pneumatic tire capable of efficiently producing a pneumatic tire which includes a lightweight inner layer with excellent air permeation prevention performance and which is excellent in uniformity.

Means for Solving the Problem

A process for producing a pneumatic tire of the present invention to achieve the object is characterized by including the steps of: forming a green tire by stacking a tire component on a film which is placed on an outer circumferential surface of a cylindrical rigid inner die formed of a plurality of split parts and which is made of any one of a thermoplastic resin and a thermoplastic elastomer composition produced by blending an elastomer with a thermoplastic resin; placing the green tire in a vulcanizing mold together with the rigid inner die, the vulcanizing mold provided in a vulcanizing apparatus; thereafter, heating the rigid inner die and the vulcanizing mold to a given temperature; vulcanizing the green tire after inflating the film with application of a pressure to the film from an inner circumferential side while tightly bonding the film to an inner circumferential surface of the tire; subsequently, removing the vulcanized tire from the vulcanizing apparatus; and removing the rigid inner die from the vulcanized tire.

Here, the film may be previously formed in a tubular shape, and the tubular film is placed on the outer circumferential surface of the rigid inner die by fitting the film onto the rigid inner die. Moreover, the green tire placed in the vulcanizing mold may be vulcanized while air is suctioned into outside of the vulcanized mold from inside thereof. The rigid inner die and the vulcanizing mold are heated to the given temperature by an electric heater, for example.

EFFECTS OF THE INVENTION

According to a process for producing a pneumatic tire of the present invention, a green tire is formed by stacking tire components on a film which is placed on an outer circumferential surface of a cylindrical rigid inner die formed of a plurality of split parts and which is made of a thermoplastic resin or a thermoplastic elastomer composition. The green tire is then placed in a vulcanizing mold together with the rigid inner die, the vulcanizing mold provided in a vulcanizing apparatus. Thereafter, the rigid inner die and the vulcanizing mold are heated to a given temperature. Then, the film is inflated by applying a pressure to the film from an inner circumferential side, and the green tire is then vulcanized. Accordingly, unvulcanized rubber of the tire components is pressed toward an inner circumferential surface of the vulcanizing mold and then flows in the circumferential direction. Thereby, even if unevenness exists in the volumes of the tire components, the unevenness is corrected. Thus, it is made possible to improve the uniformity of the tire to be produced.

The film is made to function as the conventional bladder as described above and also to serve as an inner layer of the tire by tightly bonding the film to an inner circumferential surface of the tire during the vulcanization of the green tire. The film is formed of the thermoplastic resin or the thermoplastic elastomer composition, so that the film is light in weight and has good gas-barrier properties as compared with a conventional inner layer made of butyl rubber. Thus, the produced tire can obtain lightweight and excellent air permeation prevention performance.

Moreover, the formed green tire is placed in the vulcanizing mold together with the rigid inner die, so that an operation to remove the green tire from the making drum in the case of the conventional method is no longer necessary. Further, the green tire can be easily placed at a predetermined position in the vulcanizing mold. In addition, the film serving as the inner layer can also function as a remover between the inner circumferential surface of the tire and the outer circumferential surface of the rigid inner die. Thus, the additional operation such as application of a remover is no longer necessary. The production steps can be thus reduced as described above, and the productivity can be thereby improved.

EXPLANATION OF REFERENCE NUMERALS

Figure 1:
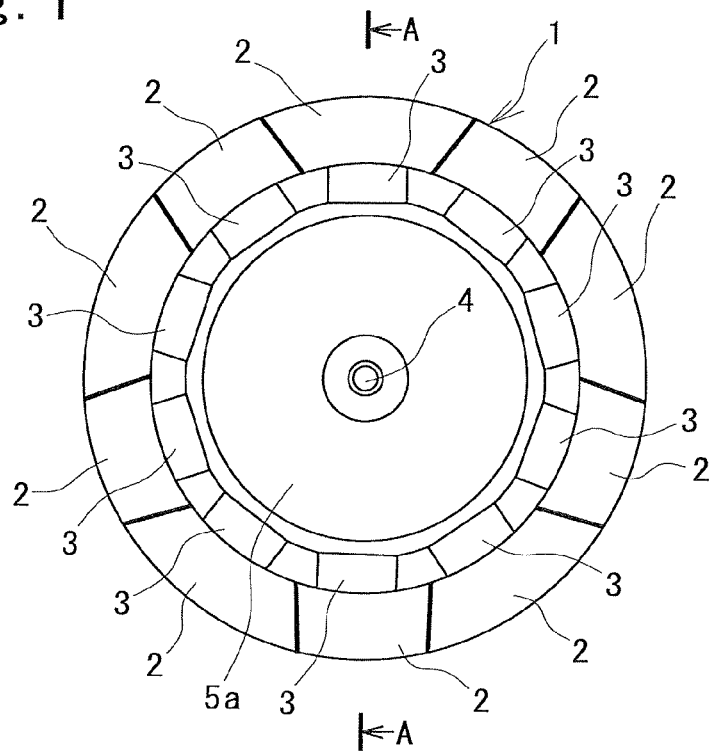
FIG. 1 is a front view of a rigid inner die used in the present invention.

1 Rigid Inner Die
2 Split Part
7 Vulcanizing Apparatus
8a Sector
8b Side Plate
9 Back Segment
11 Pneumatic Tire
12 Film
13 Carcass Layer
G Green Tire

BEST MODES FOR CARRYING OUT THE INVENTION

Hereinafter, a description will be given of a process for producing a pneumatic tire of the present invention on the basis of an embodiment illustrated in the drawings. Note that the same reference numerals are used to denote the same components before and after vulcanization.

Figure 10:
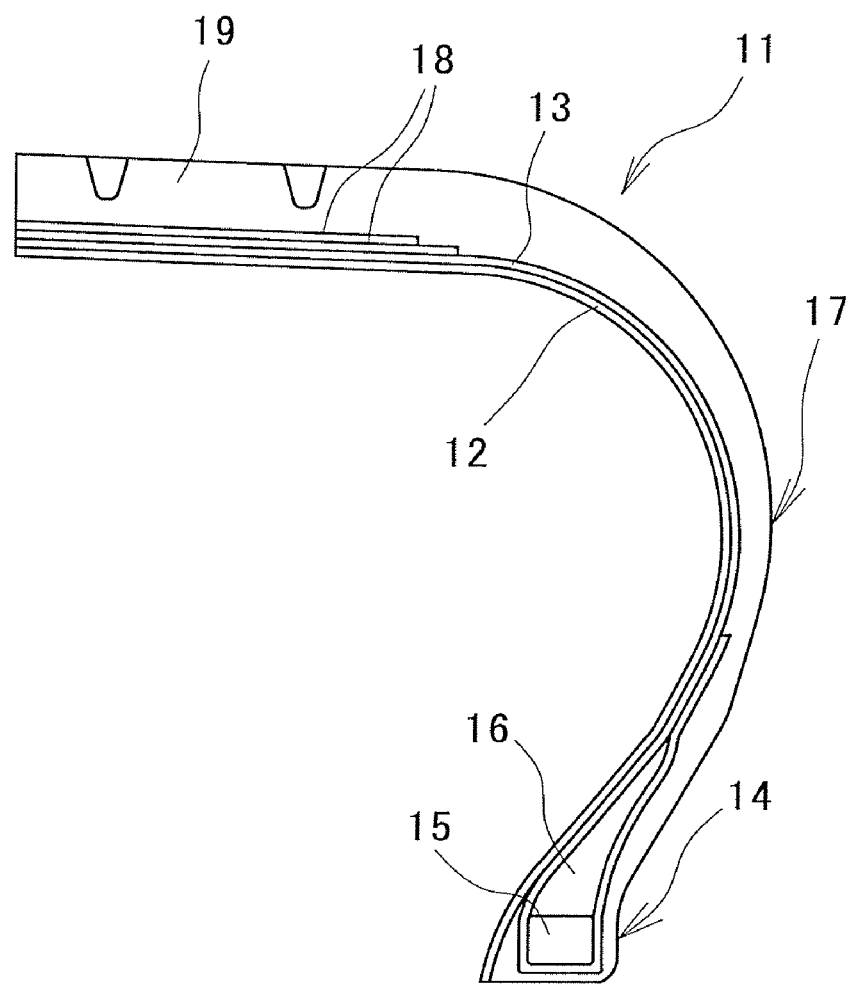
FIG. 10 is a meridian half cross-sectional view exemplifying a pneumatic tire produced according to the present invention.

FIG. 10 exemplifies a pneumatic tire 11 produced according to the present invention. In the pneumatic tire 11, a carcass layer 13 is laid between a pair of bead portions 14. The carcass layer 13 is folded back around a bead core 15 from the inner side to the outer side, while sandwiching a bead filler 16. A film 12 is provided at the inner circumferential side of the carcass layer 13 as an inner layer to prevent air permeation. A rubber member forming a sidewall portion 17 and a rubber member forming a tread portion 19 are provided at the outer circumferential side of the carcass layer 13.

In the tread portion 19 at the outer circumferential side of the carcass layer 13, belt layers 18 are provided over the entire circumference in the tire circumferential direction. Reinforcing cords forming the belt layers 18 are arranged in an inclined manner with respect to the tire circumferential direction. In addition, the reinforcing cords are arranged so that the reinforcing cords forming the stacked upper and lower belt layers 18 can intersect with each other. The pneumatic tire 11 produced according to the present invention is not limited to one having the structure of FIG. 10 and is applicable to production of a pneumatic tire having a different structure.

A large structural characteristic feature of the pneumatic tire 11 is that the inner layer conventionally made of butyl rubber is replaced with the film 12. The thickness of the film 12 is 0.005 mm to 0.2 mm, for example.

The film 12 used in the present invention is made of a thermoplastic resin or a thermoplastic elastomer composition produced by blending an elastomer in a thermoplastic resin.

Examples of the thermoplastic resin for the film 12 include: polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6, nylon 6T, nylon 6/6T copolymers, nylon 66/PP copolymers and nylon 66/PPS copolymers); polyester resins (for example, aromatic polyesters, such as polybutylene terephthalate (PBT), polyethylene terephthalate (PET), polyethylene isophthalate (PEI), polybutylene terephthalate/tetramethylene glycol copolymers, PET/PEI copolymers, polyarylate (PAR), polybutylene naphthalate (PBN), liquid crystal polyester and polyoxyalkylene diimide diacid/polybutylene terephthalate copolymers); polynitrile resins (for example, polyacrylonitrile (PAN), polymethacrylonitrile, acrylonitrile/styrene copolymers (AS), methacrylonitrile/styrene copolymers and methacrylonitrile/styrene/butadiene copolymers); poly(meth)acrylate resins (for example, polymethyl methacrylate (PMMA), polyethyl methacrylate, ethylene-ethyl acrylate copolymers (EEA), ethylene-acrylic acid copolymers (EAA) and ethylene-methyl acrylate resins (EMA)); polyvinyl resins (for example, polyvinyl acetate (EVA), polyvinyl alcohol (PVA), vinyl alcohol/ethylene copolymers (EVOH), polyvinylidene chloride (PVDC), polyvinyl chloride (PVC), vinyl chloride/vinylidene chloride copolymers and vinylidene chloride/methyl acrylate copolymers); cellulose resins (for example, cellulose acetate and cellulose acetate butyrate); fluororesins (for example, polyvinylidene fluoride (PVDF), polyvinyl fluoride (PVF), polychlorotrifluoroethylene (PCTFE), and ethylene/tetrafluoroethylene copolymers (ETFE)); and imide resins (for example, aromatic polyimide (PI)).

Examples of the elastomer include: diene rubbers and their hydrogenated products (for example, NR, IR, epoxidized natural rubbers, SBR, BR (high-cis BR and low-cis BR), NBR, hydrogenated NBR and hydrogenated SBR); olefin rubbers (for example, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers); halogen-containing rubbers (for example, Br-IIR, Cl-IIR, brominated isobutylene-p-methylstyrene copolymers (Br-IPMS), chloroprene rubber (CR), hydrin rubber (CHC and CHR), chlorosulfonated polyethylene (CSM), chlorinated polyethylene (CM), and maleic acid-modified chlorinated polyethylene (M-CM)); silicone rubbers (for example, methyl vinyl silicone rubber, dimethyl silicone rubber, and methylphenylvinyl silicone rubber); sulfur-containing rubbers (for example, polysulfide rubber); fluororubbers (for example, vinylidene fluoride rubbers, fluorine-containing vinyl ether rubbers, tetrafluoroethylene-propylene rubbers, fluorine-containing silicone rubbers, and fluorine-containing phosphazene rubbers); and thermoplastic elastomers (for example, styrene elastomers, olefin elastomers, polyester elastomers, urethane elastomers, and polyamide elastomers).

In the thermoplastic elastomer composition used in the present invention, the proportion by weight of a thermoplastic resin component (A) to an elastomer component (B) is appropriately determined by taking account of the balance between the thickness of the film and the flexibility. For example, the weight proportion of the thermoplastic resin component (A) with respect to the total weight of the thermoplastic resin component (A) and the elastomer component (B) is preferably 10% to 90%. A more preferable proportion is 20% to 85%.

In addition to the aforementioned essential components (A) and (B), a compounding agent and a different polymer such as a compatibilizer can be mixed, as a third component, with the thermoplastic elastomer composition used in the present invention. The purposes of mixing the different polymer are to improve the compatibility between the thermoplastic resin component and the elastomer component, to improve the molding processability of the material for the film, to improve the heat resistance, to reduce costs, and the like. Examples of the material used for the different polymer include polyethylene, polypropylene, polystyrene, ABS, SBS, polycarbonate, and the like.

The film 12 formed of the thermoplastic resin or the thermoplastic elastomer composition as described above has good gas-barrier properties because of excellent surface orientation of polymer chains. As described, in this pneumatic tire 11, the film 12 having the excellent gas barrier properties as compared with butyl rubber serves as the inner layer, so that excellent air permeation prevention performance can be obtained as compared with the conventional pneumatic tire.

Moreover, the thickness of the film 12 is approximately 0.005 mm to 0.2 mm while the thickness of the conventional inner layer made of butyl rubber is 0.5 mm to 5.0 mm, for example. Thus, the inner layer can be made considerably light in weight, which makes a large contribution to reduction in the weight of the pneumatic tire 11.

Figure 2:
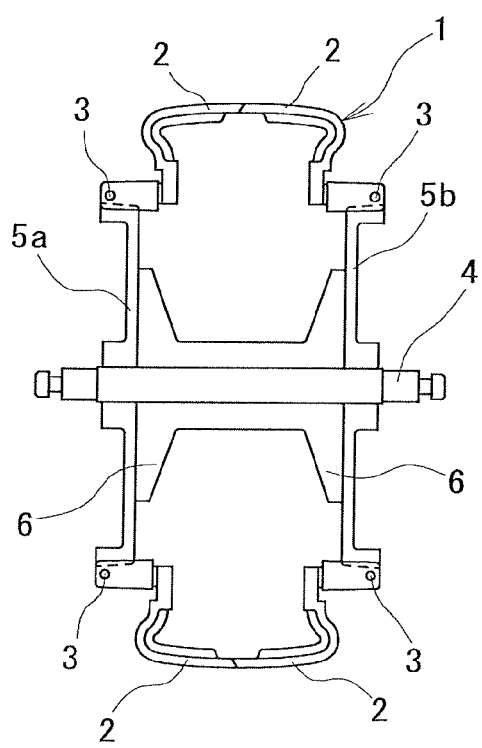
FIG. 2 is a cross-sectional view taken along the line A-A of FIG. 1.

Hereinafter, a process for producing the pneumatic tire 11 will be described. In the present invention, a rigid inner die 1 as exemplified in FIGS. 1 and 2 is used. The rigid inner die 1 in a cylindrical shape is configured of split parts 2 obtained by splitting the die in the circumferential direction. Each of the split parts 2 is configured so that the cylindrical circumferential surface thereof can be further split into two surfaces in the width direction. Examples of the material used for the rigid inner die 1 include metals such as aluminum and aluminum alloy.

The split parts 2 are operatively attached to peripheral edge portions of support plates 5a and 5b via rotational mechanisms 3, respectively, so as to form a cylindrical shape, the support plates 5a and 5b each formed in a disc-like shape and facing the other. Specifically, the split parts 2 on one side, obtained by splitting the cylindrical circumferential surfaces in the width direction, are arranged annularly along the peripheral edge portion of the support plate 5a on one side, among the support plates 5a and 5b facing each other. The split parts 2 on the other side, obtained by splitting the cylindrical circumferential surfaces in the width direction, are arranged annularly along the peripheral edge portion of the support plate 5b on the other side.

A center shaft 4 is fixed at the positions of the center circles of the support plates 5a and 5b facing each other so as to penetrate through the positions. The center shaft 4 and the pair of support plates 5a and 5b are fixed to each other with support ribs 6 fixed to the outer circumferential surface of the center shaft 4.

As described above, the rigid inner die 1 configured of the plural split parts 2 formed in the cylindrical shape moves in a way that each of the split parts 2 radially expands and contracts with the rotational mechanism 3 as the center of rotation, as will be described later.

Figure 3:
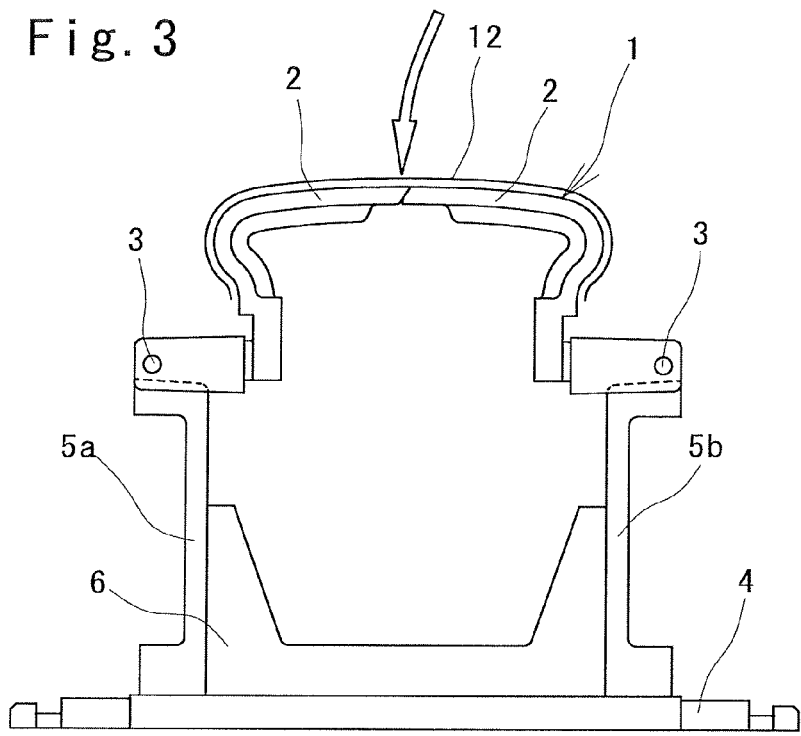
FIG. 3 is an upper-half vertical cross-sectional view exemplifying a state where a film is placed on an outer circumferential surface of the rigid inner die of FIG. 1.

In order to form a green tire G, the rigid inner die 1 formed in the cylindrical shape is attached to a molding apparatus or the like while the center shaft 4 is axially supported. Here, as exemplified in FIG. 3, the film 12 is placed so as to cover the entire outer circumferential surface of the rigid inner die 1. For example, the film 12 in a belt-like shape is placed on the outer circumferential surface of the rigid inner die 1 so that the film 12 can be wound around the outer circumferential surface of the rigid inner die 1. Alternatively, the film 12 is previously formed in a tubular shape, and the tubular film 12 is fitted onto the rigid inner die 1 and thus placed on the outer circumferential surface of the rigid inner die 1.

Figure 4:
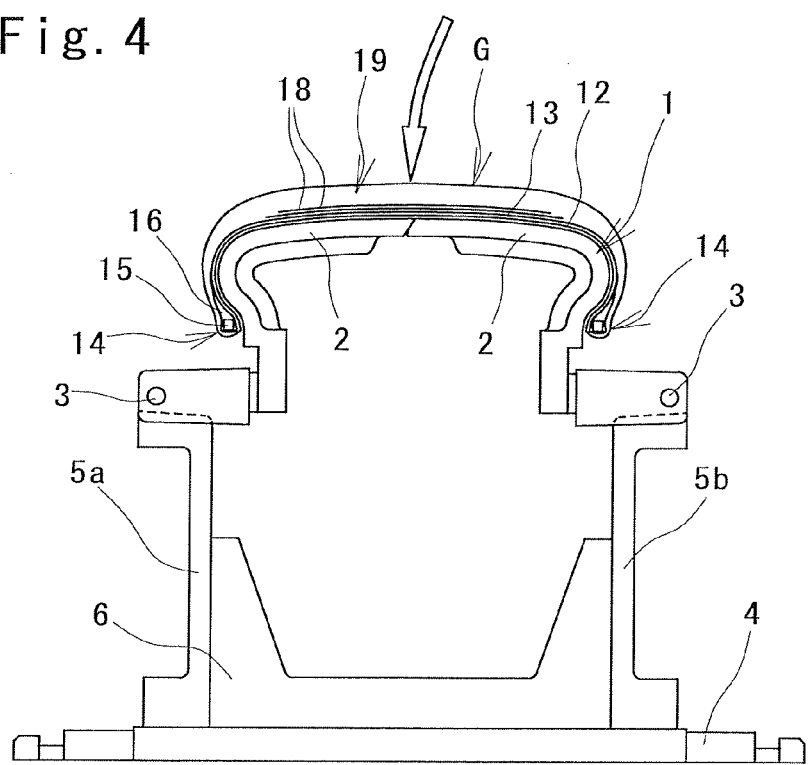
FIG. 4 is an upper-half vertical cross-sectional view exemplifying a state where a green tire is formed on the outer circumferential surface of the rigid inner die of FIG. 1.

Next, as exemplified in FIG. 4, the green tire G is formed on the film 12 by stacking the tire components such as the carcass layer 13, the bead cores 15, the bead fillers 16, a rubber member of the side wall portion 17, the belt layers 18 and a rubber member of the tread portion 19 on one another. The formation method such as folding back of the carcass layer 13 around the bead core 15 is performed in the same manner as in the conventional method. During the formation of the green tire G, the film 12 may be caused to shrink appropriately by heating or cooling.

Figure 5:
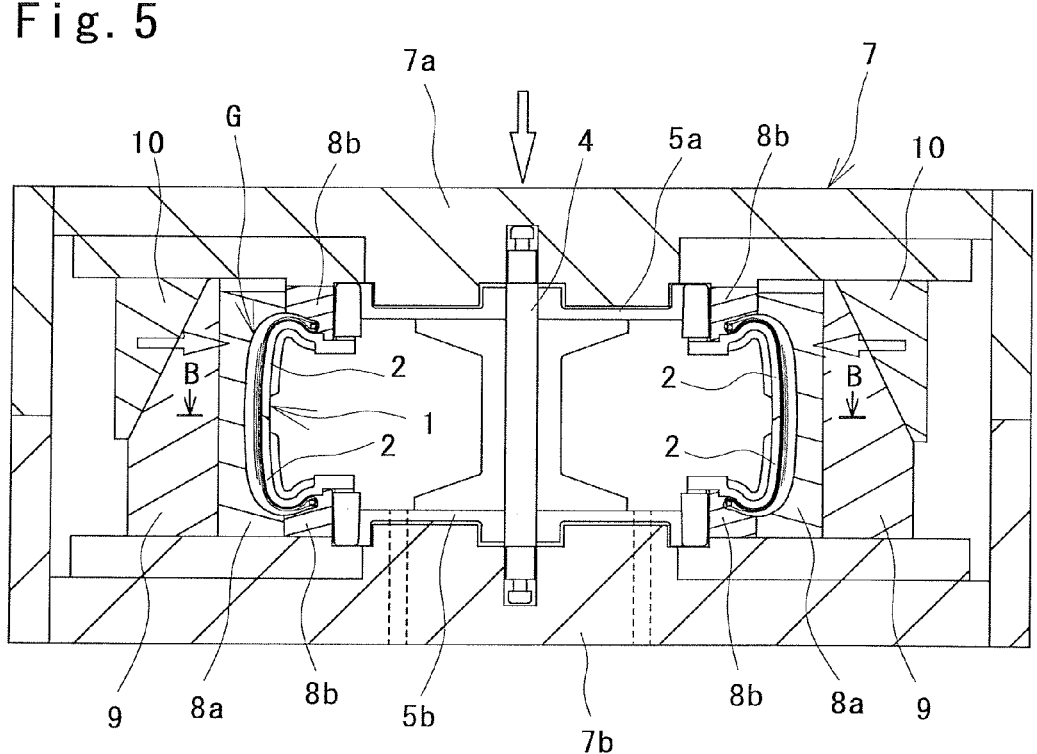
FIG. 5 is a vertical cross-sectional view exemplifying a state where the green tire of FIG. 4 is vulcanized.

Next, as exemplified in FIG. 5, the formed green tire G is placed at a predetermined position in a vulcanizing mold together with the rigid inner die 1, the vulcanizing mold provided in a vulcanizing apparatus 7. The vulcanizing mold is configured of plural sectors 8a which are split in the tire circumferential direction, and upper and lower circular side plates 8b and 8b.

The lower side plates 8b are fixed to a lower housing 7b on which the sectors 8a are placed. A back segment 9 having an inclined surface is attached to the back surfaces of the sectors 8a. A guide member 10 having an inclined surface and the upper side plate 8b are fixed to an upper housing 7a.

After the lower edge portion of the center shaft 4 of the rigid inner die 1, which holds the green tire G, is inserted into the center hole of the lower housing 7b, the upper housing 7a is moved downward. The inclined surface of the guide member 10, which moves downward along with the downward movement, is abutted to the inclined surface of the back segment 9. As the guide member 10 moves downward, the sectors 8a gradually move toward the center shaft 4 together with the back segment 9. Specifically, the sectors 8a having been radially expanded move while radially contracting, and are assembled in an annular shape. Then, the upper side plate 8b moving downward is placed on the upper inner circumferential edge portions of the sectors 8a assembled in the annular shape. The upper edge portion of the center shaft 4 is then inserted into the center hole of the upper housing 7a.

As described above, the formed green tire G is placed inside the vulcanizing mold together with the rigid inner die 1, so that the operation to remove the green tire G from the making drum in the case of the conventional method is no longer necessary, and the step of removing the green tire G thus can be omitted. In addition, the center holes of the upper housing 7a and the lower housing 7b are formed with predetermined accuracy. Thus, the positioning of the rigid inner die 1 can be made by only inserting the center shaft 4 thereof in the center holes, and the green tire G can be easily placed at a predetermined position in the forming mold with high accuracy. It is thereby made possible to improve the productivity and to efficiently produce the pneumatic tire 11.

Figure 6:
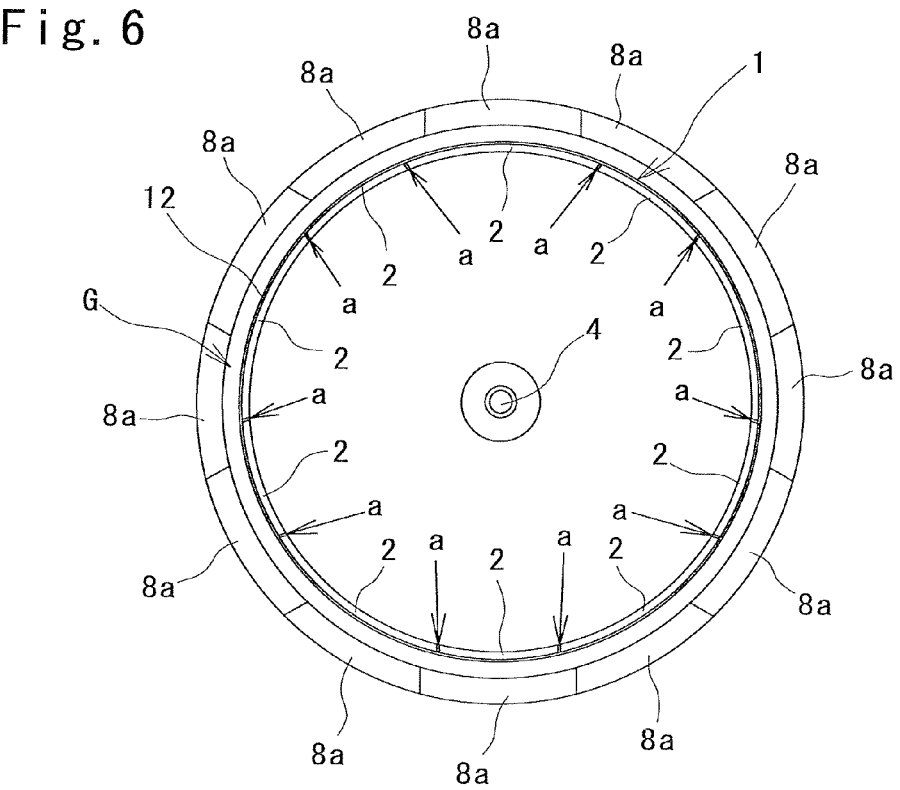
FIG. 6 is a cross-sectional view taken along the line B-B of FIG. 5.
Figure 7:
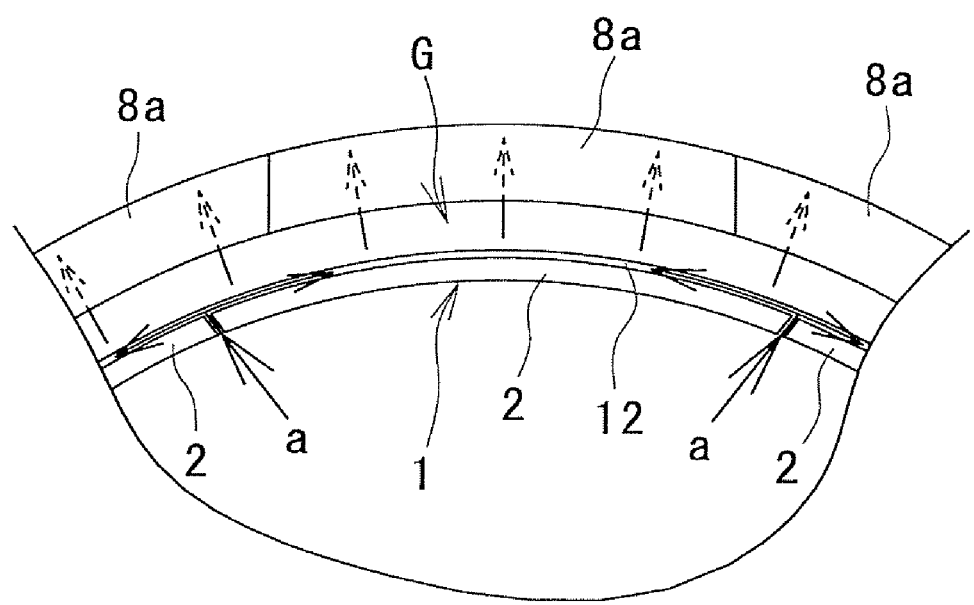
FIG. 7 is an enlarged view of a part of FIG. 6.

Next, as exemplified in FIG. 6, the rigid inner die 1 and the vulcanizing mold are heated to a given temperature, and the film 12 is pressurized by supplying air a from the inner circumferential side thereof. Then, the green tire G is vulcanized while the film 12 is being inflated. As exemplified in FIG. 7, the air a blowing off from a gap between the split parts 2 adjacent to each other enters between the outer circumferential surfaces of the split parts 2 and the inner circumferential surface of the film 12.

Unvulcanized rubber in the tire components is thereby pressed toward the inner circumferential surfaces of the sectors (vulcanizing mold) 8a. Then, the unvulcanized rubber flows in the circumferential direction of the sectors 8a along with the pressure. Accordingly, if unevenness exists in the volumes of the tire components of the green tire G, the unevenness is corrected. Thus, it is made possible to improve the uniformity of the pneumatic tire 11 to be produced.

Note that the pressure to be applied by supplying the air a from the inner circumferential side of the film 12 may be applied after the sectors 8a and the upper and lower side plates 8b and 8b are assembled to each other, a certain amount of pressure may be applied before these components are assembled, or the pressure can be applied while these components are assembled.

The film 12, which functions as the conventional bladder as described above, is tightly bonded to the inner circumferential surface of the tire while the green tire G is vulcanized, and thus the pneumatic tire 11 having the film 12 as the inner layer is produced. In order to enhance the bonding force between the film 12 and the inner circumferential surface of the tire, an adhesion layer may be previously provided on the outer circumferential surface of the film 12. The present invention is advantageous in improving the productivity because the conventional bladder is not used, and the maintenance of the bladder is thus not required.

The rigid inner die 1 and the vulcanizing mold can be heated by various heat sources. For example, an electric heater embedded in each of the rigid inner die 1 and the vulcanizing mold can be used. The heating by the electric heater allows an accurate temperature control. In addition, a cooling system can be provided to the rigid inner die 1.

In the vulcanizing process, the outer circumferential surface of the green tire G is formed in a predetermined shape by the sectors 8a, and the inner circumferential surface thereof is formed while being tightly bonded to the film 12 because of the inflation of the film 12. For this reason, unlike the conventional production method using a bladder made of rubber or a production method in which a green tire is pressed toward the outer circumferential surface of the rigid inner die, no unnecessary mark is left on the inner circumferential surface of the vulcanized pneumatic tire, and the surface of the tire becomes smooth. Accordingly, the quality of the external appearance thereof is improved.

In addition, the green tire G can be vulcanized while the air is forcibly suctioned into the outside of the vulcanizing mold from the inside thereof. For example, the green tire G can be vulcanized in a negative pressure state where the air is vacuumed by using a vacuum pump. In this manner, the air among the stacked tire components or the air in the tire components (rubber members) can be removed, so that a problem due to entering of the air in the produced pneumatic tire 11 can be prevented, and the quality thereof can be thus improved.

Next, the vulcanized pneumatic tire 11 is removed from the vulcanizing apparatus 7 together with the rigid inner die 1.

Subsequently, the rigid inner die 1 is removed from the vulcanized pneumatic tire 11. The removal of the rigid inner die 1 is performed by firstly, as exemplified in FIG. 8, releasing the engagement of the rotational mechanisms 3 and the support plates 5a and 5b, respectively, while the rotational mechanisms 3 of the respective split parts 2 are held by the rigid inner die 1 from the both sides in the width direction. In this state, the support plate 5a on one side is removed from the center shaft 4, and the support plate 5a on this side and the side plate 5b on the other side to which the rotational shaft 4 is still fixed are moved to the outer side of the vulcanized pneumatic tire 11.

Figure 9:
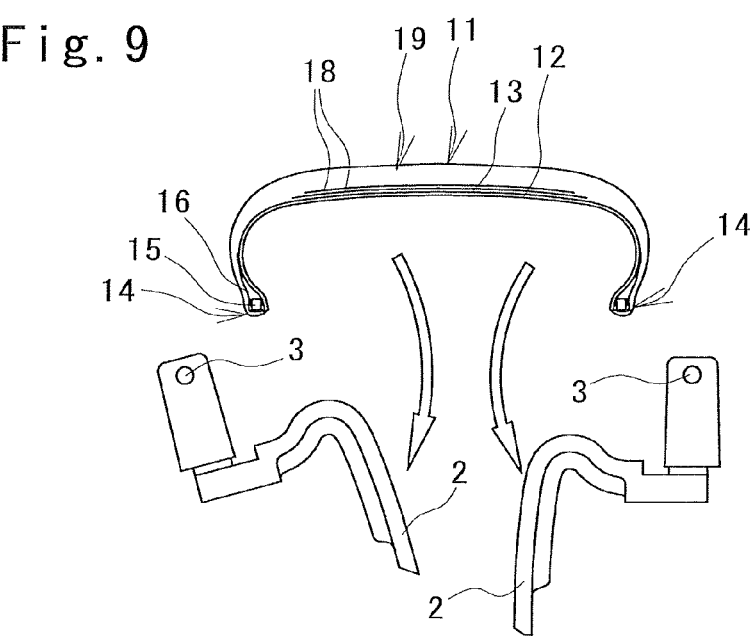
FIG. 9 is an upper-half vertical cross-sectional view exemplifying a step subsequent to the step of FIG. 8.

Next, as exemplified in FIG. 9, the split part 2 on one side in the width direction (right side in FIG. 9) is rotated toward the inside of the tire in a way that the cylindrical rigid inner die 1 is radially contracted with the rotational mechanism 3 as the center. Thereafter, the split part 2 on the other side in the width direction (left side in FIG. 9) is rotated toward the inside of the tire in a way that the cylindrical rigid inner die 1 is radially contracted with the rotational mechanism 3 as the center. After the split parts 2 are rotated toward the inside of the tire in the above described manner, the split parts 2 are moved to the outer side of the pneumatic tire 11 and then removed.

The film 12 is easily separated off from the split parts 2, so that the rigid inner die 1 can be smoothly removed as compared with a pneumatic tire having butyl rubber as the inner layer. Because of the excellent separation properties of the film 12, the additional operation such as the application of a remover between the inner circumferential surface of the tire and the rigid inner die 1 (split parts 2) is no longer necessary. Thus, the production method is even more advantageous in improving the productivity.

Figure 8:
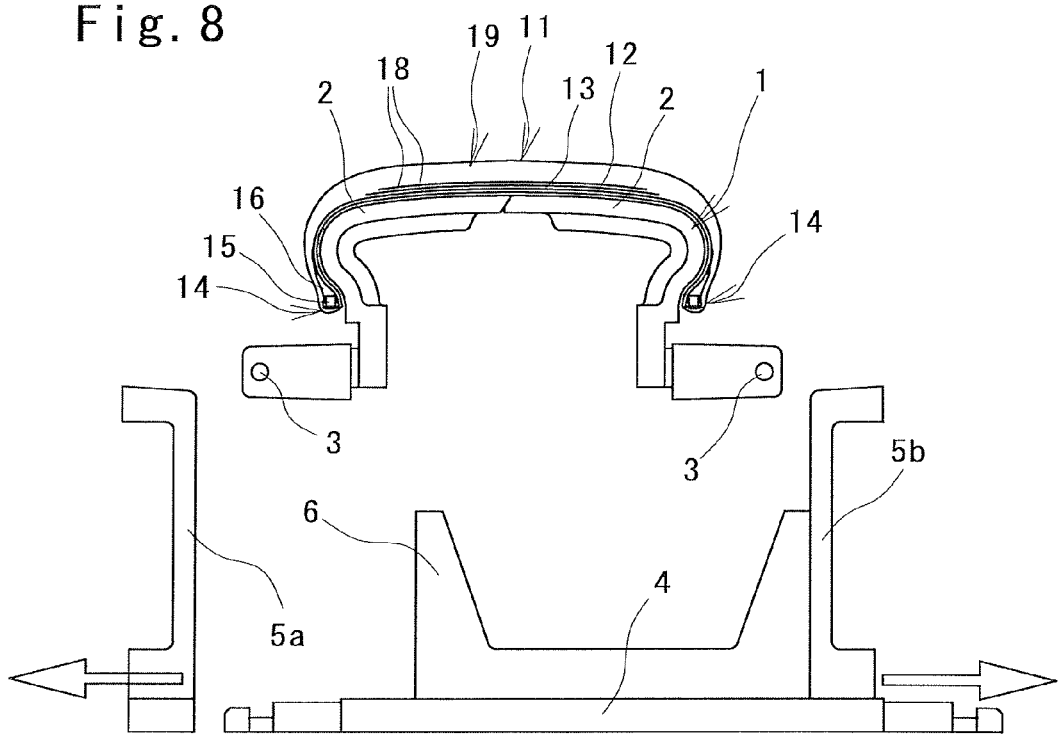
FIG. 8 is an upper-half vertical cross-sectional view exemplifying a step of removing the rigid inner die from the vulcanized tire.

Note that, in order to assemble the rigid inner die 1 in a cylindrical shape, the procedure reversal to the procedure of disassembling the rigid inner die 1 as exemplified in FIGS. 8 and 9 may be performed.

As has been described above, in the present invention, the film 12 made of the thermoplastic resin or the thermoplastic elastomer composition is sophisticatedly utilized so as to function as: the bladder, the inner layer of the tire, and the remover of the rigid inner die 1 (split parts 2). Thereby, the pneumatic tire 11 which includes the lightweight inner layer having excellent air permeation prevention performance and which is excellent in uniformity can be efficiently produced.

In the aforementioned embodiment, the description has been given of an example in which a radial tire is produced, but the present invention can be applied to a case where a bias tire is produced.

What is claimed is:

1. A process for producing a pneumatic tire comprising the steps of:

forming a green tire by stacking a tire component on a film which is placed on an outer circumferential surface of a cylindrical rigid inner die, wherein said die is formed of a plurality of split parts obtained by splitting the cylindrical rigid inner die in a circumferential direction, and further obtained by splitting cylindrical circumferential surfaces of the split parts into two surfaces in a width direction, each of the split parts being operatively attached to a peripheral edge portion of a corresponding one of two opposed support plates via a respective rotational mechanism, and wherein said film is made of any one of a thermoplastic resin and a thermoplastic elastomer composition produced by blending an elastomer with a thermoplastic resin;

placing the green tire in a vulcanizing mold together with the rigid inner die, the vulcanizing mold provided in a vulcanizing apparatus;

thereafter, heating the rigid inner die and the vulcanizing mold to a given temperature;

vulcanizing the green tire after inflating the film with application of a pressure to the film from an inner circumferential side while tightly bonding the film to an inner circumferential surface of the tire, wherein air is suctioned from inside of the vulcanizing mold to the outside thereof during the vulcanizing step, and wherein the green tire is vulcanized in a negative pressure state;

subsequently, removing the vulcanized tire from the vulcanizing apparatus; and removing the rigid inner die from the vulcanized tire.

2. The process for producing a pneumatic tire according to claim 1, wherein the film is previously formed in a tubular shape, and the tubular film is placed on the outer circumferential surface of the rigid inner die by fitting the film onto the rigid inner die.

3. The process for producing a pneumatic tire according to claim 1, wherein the rigid inner die and the vulcanizing mold are heated to the given temperature by an electric heater.

4. The process for producing a pneumatic tire according to claim 2, wherein the rigid inner die and the vulcanizing mold are heated to the given temperature by an electric heater.

5. The process for producing a pneumatic tire according to claim 1, wherein the step of removing the rigid inner die from the vulcanized tire comprises:

disconnecting the rotational mechanisms from the support plates;

removing the support plates from the rigid inner die;

pivotally moving a first split part on a first side of the tire about a pivotal portion of an associated rotational mechanism to move a radially outer portion of the first split part inwardly towards a central axis of the tire;

pivotally moving a second split part on a second side of the tire about a pivotal portion of an associated rotational mechanism to move a radially outer portion of the second split part inwardly towards the central axis of the tire; and removing the first and second split parts and the associated rotational mechanisms from the tire.

* * * * *